Feb. 20, 1962     G. MARCHIOLI ETAL     3,021,900
APPARATUS FOR MANUFACTURING PIPES
FROM PLASTIC MATERIALS
Filed Oct. 1, 1958
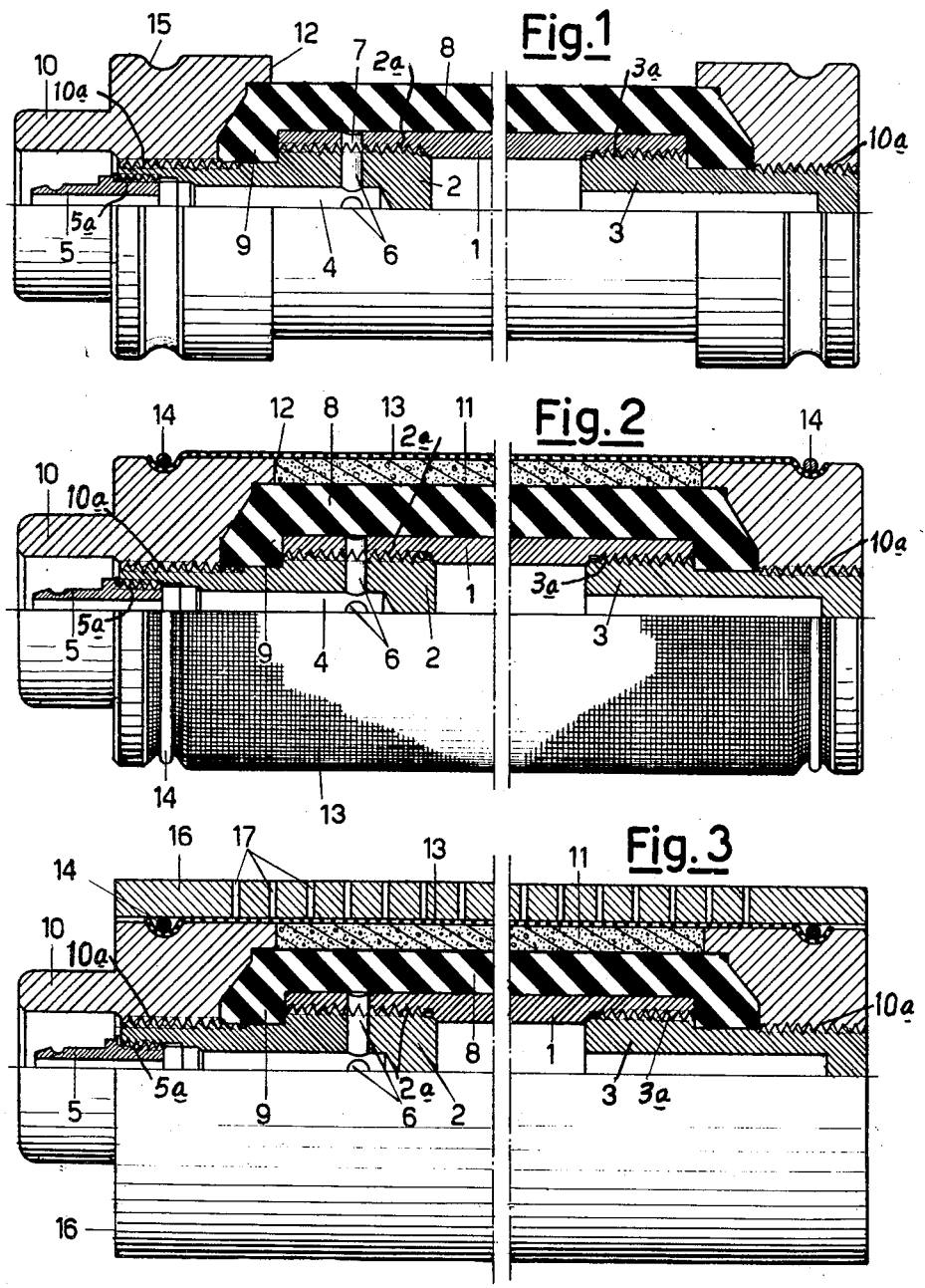

3,021,900
APPARATUS FOR MANUFACTURING PIPES
FROM PLASTIC MATERIALS
Giorgio Marchioli, Via Morgagni 22, and Giuseppe Gremigni, Via Lomellina 52, both of Milan, Italy
Filed Oct. 1, 1958, Ser. No. 764,625
Claims priority, application Italy Oct. 10, 1957
4 Claims. (Cl. 162—402)

It is know to produce hollow bodies of plastic materials, such as for instance asbestos-cement or synthetic resins, within a mould that confines the external surface of the hollow body, while an expanding core determines and shapes the cavity of the body.

The expanding core permits the wall of the hollow body to be subjected to pressure, thereby increasing the strength and accuracy of shaping of the body. Existing moulds used in the above manner are divided into at least two parts to permit extraction of the shaped article, when the latter is not an article having a conical or otherwise tapered shape that can be easily extracted from one end of the mould.

In particular, in the case of pipes having a constant cross-section at least over a considerable portion of their length, it is not possible with the existing molds to extract the pipe from the mould unless the latter is divided or separated along a diametrical plane, because the adherence of the pipe to the wall of the mould does not allow for extraction without destroying or damaging the pipe.

Further, if the wall of the mould must be perforated to allow for leakage of a gaseous or liquid component of the plastic material employed, for instance water in the case of an asbestos-cement mixture, the perforations of the mould constitute an anchorage for the compressed plastic material and make axial extraction of the pipe completely impossible.

The division of the mould into two parts, on the other hand, constitutes a considerable inconvenience because the connection between the two parts needs to resist the internal pressure applied to the plastic material by means of the expansible core. If that pressure is very high, the connection is subject to bursting and, therefore, to divergence of the two parts composing the mould, permitting outflow of the plastic material which is strongly compressed.

Hence it is not possible with a mould having a cylindrical cavity subdivided into two parts along a diametrical plane, to compress the material destined to form the pipe to pressures above a limit which is low as compared with the pressure that can be withstood by the material of which the two halves of the mould are made.

It is an object of the present invention to produce pipes of uniform cross-section from an aqueous plastic mix, such as—but not exclusively—asbestos cement, by means of the use of a one-piece tubular mould and an expansible cylindrical core.

According to an aspect of this invention, the plastic material is put on the expansible cylindrical core and then wrapped with a preferably permeable sheet material, whereupon the whole is introduced into a preferably perforated tubular mould. The core is made to expand with the desired pressure while allowing the water, if any, contained in the material, to leak through said sheet material and through the perforations of the mould. When the pressure is released, the core with the formed pipe and sheet material wrapping thereon is extracted from the mould in the axial direction. After the permeable sheet is unwrapped from the external surface of the pipe, the latter is axially removed from the core. The sheet material used to wrap around the plastic material should be resistant enough as not to be extruded by the pressure through the perforations of the mould. A very fine mesh wire gauze or net is recommended for this purpose; but a foraminous or perforated sheet is also usable.

Prior to effecting practical tests, it was to be expected that extracting a pipe so shaped in a one-piece mould would be very difficult or impossible. In fact, the shaped pipe is in a state of compression which may be very strong and, therefore, one could believe that it would react against the inner surface of the mould, through the sheet of permeable material, in such a way as to provide an anchorage of the pipe in the mould which could not be released by an axial thrust.

However, it has been found that this expected difficulty does no materialize even if the pressure used to expand the core is considerable.

This may be explained by the stretching of the innermost portion of the tubular wall of the formed pipe during compression, whence recovery of said stretch opposes the internal stress of the material which would tend to press the external surface of the pipe against the internal surface of the mould when the pressure is released within the core.

This explanation however is suggested by way of hypothesis, and the reason may be even different. It is important, however, to note that whatever the cause may be, the pipe can be extracted axially from the mould together with the sheet material that covers it, with a very moderate effort.

For instance, an asbestos-cement pipe having a 20 cm. diameter and a 1 cm. thickness, and shaped with an internal pressure in the core of 130 kg./sq. cm., can be extracted from the mould together with the core and with the metal wire gauze or net covering it, by an axial force not exceeding 50 kg. per meter of length of the pipe.

Thus, if after expansion of the core and compression of the pipe and the following release of the pressure from inside the core, the latter together with the pipe and the wire gauze or net covering it, is removed from the mould at once, the axial effort for extraction is comparatively low. On the other hand, if the core with the pipe and the wire gauze wrapping are left in the mould, for instance for one hour before extracting it, the extraction requires a much greater effort. This might justify the hypothesis that the material composing the pipe, stabilizing at once after being stretched by the pressure to which said material has been subjected, discharges by elastic hysteresis against the inner wall surface of the mould; and this obviously would greatly increase the adherence of the pipe to the mould.

However, there is no reason for leaving the shaped pipe within the mould, because this would represent only loss of time and would make it necessary to have a greater number of moulds available.

The advantages of moulds embodying the invention are very important.

Above all it is possible to compress the material constituting the pipe to many decades of kg. per sq. cm., which is impossible with conventional moulds. This increased compression of the pipe material in the mould makes it possible to obtain pipes having improved strength upon removal from the mould so that, in the case of asbestos-cement pipes, those pipes just moulded may be cured in the air or in the water by superimposing them in piles without any need for internal support. When the cement has set, the pipes obviously are much stronger than those obtained by other methods and have moreover a high degree of impermeability.

Pipes of asbestos-cement made in accordance with the invention, have a specific gravity of 2.0 and even more. Another advantage resides in the fact that the surface of the pipe so obtained is perfectly cylindrical and smooth and does not possess the burrs or flashing inevitably left behind by the moulds composed of two halves. Hence no supplemental working of the cylindrical surface is necessary, and the consequent loss of time and waste is avoided.

The accompanying drawing shows an apparatus for moulding pipes according to the present invention, wherein:

FIG. 1 is an elevational view, partly in axial section, of the core;

FIG. 2 is a view similar to that of FIG. 1, but showing the core covered by the permeable sheet material; and FIG. 3 shows the whole assembly of FIG. 2 within the mould.

Referring in detail to FIG. 1, it will be seen that the core of the apparatus embodying the invention includes a supporting metal tube 1 closed at its ends by pieces 2 and 3 which have threaded connections with tube 1, as at 2a and 3a. The piece 2 has an axial bore 4 opening at its outer end, and a pipe coupling or nipple 5 is threaded into bore 4, as at 5a. Radial holes 6 extend from bore 4 and communicate with radial holes 7 extending through the wall of tube 1.

A tubular rubber sleeve 8 is fitted over the tube 1 and is provided with inwardly directed end flanges 9 which fit over the end edges of tube 1 and closely extend around the pieces 2 and 3. Flanges 9 are held in place by annular end pieces or heads 10 which are threaded onto the pieces 2 and 3, as at 10a.

A layer of asbestos-cement 11 is applied to the above described core by any method known per se, for instance by means of a rotating cylinder dipping into a vat containing the mix which thus is wrapped in a thin layer over the rubber sleeve 8 of the core until attaining the desired thickness equal to that of annular end faces 12 of the end pieces 10, projecting radially beyond the rubber sleeve 8.

Then a sheet of metal wire gauze or net 13 of brass wire, having for instance 10 meshes per cm., is wrapped over the cylindrical surface of the asbestos-cement, and is held in place by two elastic split rings 14 which are received in seat forming annular grooves 15 formed in the end pieces 10.

The gauze or net sheet 13 should cover the entire surface of the asbestos-cement layer, and, if necessary may overlap a little.

In the case where a foraminous metal sheet is used, it is advisable to avoid overlapping and even that the width of the metal sheet should be slightly less, for example by 0.5 mm., than the internal circumference of the tubular mould.

The assembly of the core, the cement-asbestos layer 11 and sheet 13 is introduced into a tubular mould 16 provided with holes or perforations 17. Then water or compressed air is pumped into the pipe coupling 5, and passes through bore 4 and holes 6 and 7 to act between the metal tube 1 and the rubber sleeve 8, so that the latter expands and presses radially outward against the asbestos-cement 11 which is shaped and pressed against mould 16 while the excess water contained therein discharges through the gauze or net sheet 13 and flows out through the holes 17. The pressure employed may be for instance of the order of magnitude of 100 kg./sq. cm. and even more; the duration of that compression may be for instance of the order of magnitude of about 1 minute.

On termination of compression, the pressure fluid is discharged from the core and, by means of manual or mechanical axial pressure or traction, the core is drawn out of the mould 16, together with the pressed asbestos-cement pipe and the wire gauze sheet 13 wrapped around the moulded pipe.

The latter is not only retained by the rings 14 but is also solidly anchored to the surface of the asbestos-cement pipe against any slipping with respect to that surface since the asbestos-cement has been made partly to penetrate into the holes of the gauze or net.

Following removal from the mould 16, the rings 14 are removed and the screen 13 is unwrapped immediately from the asbestos-cement pipe. Then one of the end pieces or heads 10 is unscrewed and the formed pipe is axially removed from the contracted rubber sleeve 8 of the core. The removed pipe then only needs to be cured and trimmed at its end edges.

Although a particular apparatus embodying the invention has been described in detail herein with reference to the accompanying drawing, it is to be noted that the invention is not limited to the structural details of that embodiment, and that various changes and modifications may be effected therein without departing from the scope or spirit of the invention, except as defined in the appended claims.

We claim:

1. Apparatus for manufacturing cylindrical pipes of uniform cross-section from plastic material, comprising a core including a tubular, radially expansible resilient sleeve and removable heads clamping the opposite ends of said sleeve and having cylindrical outer surfaces with diameters greater than the outer diameter of said sleeve, the inner ends of said heads defining annular end faces projecting radially beyond the outer surface of said sleeve so that the plastic material can be deposited on said outer surface between said end faces, a liquid pervious sheet wrapped around said core and extending axially onto said cylindrical outer surfaces of the heads, retaining means releasably securing said sheet to said heads and being flush with said cylindrical outer surfaces of the heads, a one-piece, perforated tubular mould having a uniform internal diameter as large as the outer diameter of said pervious sheet on said outer surfaces of the heads and opening axially at least at one end, said mould having a length substantially larger than the axial distance between said annular end faces of the heads and telescopically receiving said core with said pervious sheet secured on the latter, and means for supplying fluid under pressure to act against the inner surface of said resilient sleeve and thereby radially expand the latter for compressing the plastic material against said pervious sheet and one-piece mould.

2. Apparatus as in claim 1; wherein said core further includes a rigid inner tubular structure against which said heads clamp the ends of said sleeve and through which the fluid under pressure passes to act against said inner surface of the resilient sleeve.

3. Apparatus as in claim 1; wherein said flush retaining means includes resilient split rings extending around the opposite end portions of said pervious sheet, said cylindrical outer surface of the heads having annular, radially outward opening grooves receiving said split rings so that the latter do not protrude beyond the surface of said sheet between said heads; and wherein said length of the tubular mould is greater than the axial distance between said grooves so that said mould retains said split rings in said grooves.

4. Apparatus as in claim 3; wherein said pervious sheet is in the form of woven metal screening.

References Cited in the file of this patent

UNITED STATES PATENTS

| 1,898,881 | Magnani | Feb. 21, 1933 |
| 2,377,298 | MacDonald | May 29, 1945 |
| 2,650,409 | Dubbs | Sept. 1, 1953 |
| 2,865,079 | Marchioli et al. | Dec. 23, 1958 |

FOREIGN PATENTS

| 530,837 | Belgium | Aug. 14, 1954 |